(12) United States Patent
Peng et al.

(10) Patent No.: US 8,971,059 B2
(45) Date of Patent: Mar. 3, 2015

(54) RESONANT CONVERTING CIRCUIT AND RESONANT CONTROLLER

(75) Inventors: Ke Peng, Wuxi (CN); Li-Min Lee, New Taipei (TW); Chung-Che Yu, New Taipei (TW); Shian-Sung Shiu, New Taipei (TW)

(73) Assignee: Green Solution Technology Co., Ltd., New Taipei (TW)

( * ) Notice: Subject to any disclaimer, the term of this patent is extended or adjusted under 35 U.S.C. 154(b) by 290 days.

(21) Appl. No.: 13/447,285

(22) Filed: Apr. 16, 2012

(65) Prior Publication Data

US 2013/0121037 A1     May 16, 2013

(30) Foreign Application Priority Data

Nov. 15, 2011   (TW) .............................. 100141500 A

(51) Int. Cl.
*H02M 3/335*      (2006.01)
*H02H 7/10*       (2006.01)
*H02M 1/36*       (2007.01)
*H02M 3/337*      (2006.01)
*H02M 1/00*       (2006.01)

(52) U.S. Cl.
CPC . *H02H 7/10* (2013.01); *H02M 1/36* (2013.01); *H02M 3/335* (2013.01); *H02M 3/3376* (2013.01); *Y02B 70/1433* (2013.01); *H02M 2001/0058* (2013.01); *Y02B 70/1491* (2013.01)
USPC ...................................... 363/21.03

(58) Field of Classification Search
CPC ............ H02M 3/335; H02M 3/33507; H02M 3/33553; Y02B 70/1491; Y02B 70/1433
USPC ........................................... 363/21.01–21.09
See application file for complete search history.

(56) References Cited

U.S. PATENT DOCUMENTS

| 7,375,987 | B2 |   | 5/2008  | Kyono |             |
|-----------|----|---|---------|-------|-------------|
| 7,768,801 | B2 | * | 8/2010  | Usui et al. | 363/21.06 |
| 7,952,296 | B2 | * | 5/2011  | Yu et al.   | 315/224   |
| 8,582,321 | B2 | * | 11/2013 | Li et al.   | 363/21.02 |

* cited by examiner

*Primary Examiner* — Adolf Berhane
*Assistant Examiner* — Yemane Mehari
(74) *Attorney, Agent, or Firm* — Jianq Chyun IP Office

(57) ABSTRACT

A current detecting circuit detects a resonant current in a primary side of a resonant converting circuit to generate a current detecting signal. An output detecting circuit generates a feedback signal according to the output voltage. A resonant controller generates a clock signal and adjusts an operating frequency of the clock signal in response to the feedback signal for modulating the output voltage of the resonant circuit. The resonant controller includes a resonance deviation protection unit which detects the current detecting signal according to a phase of the clock signal to determine whether the resonant circuit enters a region of zero current switching or not. When the resonant circuit enters the region of zero current switching, the resonant controller executes a corresponding protection process in response to that the resonant controller operates in a starting mode or a normal operating mode.

10 Claims, 3 Drawing Sheets

RESONANT CONVERTING CIRCUIT AND RESONANT CONTROLLER

CROSS-REFERENCE TO RELATED APPLICATION

This application claims the priority benefit of Taiwan application serial no. 100141500, filed on Nov. 15, 2011. The entirety of the above-mentioned patent application is hereby incorporated by reference herein and made a part of this specification.

BACKGROUND

1. Field of the Invention

The present invention relates to a resonant converting circuit and a resonant controller, and more particularly relates to a resonant converting circuit and a resonant controller with a function of resonance deviation-free.

2. Description of Related Art

A resonant converting circuit has an advantage of high conversion efficiency by zero voltage switching or zero current switching, particularly a half-bridge LLC converting circuit, and is used in more and more wide field.

FIG. 1 is a schematic diagram of a relationship between a gain and an operating frequency of a half-bridge LLC converting circuit, wherein a frequency f1 is a frequency corresponding to a full load rating and a frequency f2 is a frequency corresponding to a peak of a resonance curve. The frequency f2 divides the resonance curve into operating regions of zero voltage switching (ZVS) and zero current switching (ZCS). The gain is decreased while the frequency increases in the operating region of zero voltage switching and increased while the operating frequency increases in the operating region of zero current switching. The half-bridge LLC converting circuit is usually designed to operate in the region of zero voltage switching for decreasing switching loss. If the half-bridge LLC converting circuit enters the region of zero current switching, the following serious results occur. First, the half-bridge LLC converting circuit losses the control of an output voltage due to that a negative feedback is changed into a positive feedback. Second, the switch loss of the full-bridge LLC converting circuit becomes larger.

In the conventional arts, the protection method for avoiding the half-bridge LLC converting circuit operating in the region of zero current switching is increasing operation frequency or limiting the minimum duty cycle. However, whichever method mentioned above can't ensure that the half-bridge LLC converting circuit never operates in the region of zero current switching under all conditions, such as: the circuit operating abnormally, the parameters of components being wrongly set.

SUMMARY

The conventional protection method of zero current switching cannot make sure that a resonant converting circuit does not enter the region of zero current switching under any conditions. A resonant converting circuit and a resonant controller of the present invention provide different protection functions according to different operating modes when determining that the resonant converting circuit operates in the region of zero current switching. Therefore, the present invention can make sure that the resonant converting circuit does not operate in the region of zero current switching under any conditions.

To accomplish the aforementioned and other objects, an exemplary embodiment of the invention provides a resonant converting circuit comprising a resonant circuit, a current detecting circuit, an output detecting circuit and a resonant controller. The resonant circuit has a primary side for receiving an electric power from an input power source and a secondary side for providing an output voltage. The current detecting circuit is coupled to the primary side of the resonant circuit to detect a resonant current flowing there through to generate a current detecting signal. The output detecting circuit is coupled to the secondary side of the resonant circuit to generate a feedback signal according to the output voltage. The resonant controller generates a clock signal and adjusts an operating frequency of the clock signal in response to the feedback signal for modulating the output voltage of the resonant circuit. The resonant controller comprises a resonance deviation protection unit which detects the current detecting signal in response to a phase of the clock signal to determine whether the resonant circuit enters a region of zero current switching or not. When the resonant circuit enters the region of zero current switching, the resonant controller executes a corresponding protection process in response to that the resonant controller operates in a starting mode or a normal operating mode.

To accomplish the aforementioned and other objects, an exemplary embodiment of the invention further provides a resonant controller adapted to control a power conversion of a resonant circuit. The resonant controller comprises a frequency sweeping unit, a resonance deviation protection unit and a logic control unit. The frequency sweeping unit generates a clock signal and executes a frequency sweeping process after the resonant controller starts to decrease an operating frequency of the clock signal with time. The operating frequency of the clock signal is modulated according to a feedback signal indicative of an output voltage of the resonant circuit after frequency sweeping process. The logic control unit controls the power conversion of the resonant circuit according to the clock signal. The resonance deviation protection unit detects the current detecting signal to determine whether the resonant circuit enters a region of zero current switching or not according to a phase of the clock signal. The resonance deviation protection unit generates a protection signal according to an indicative signal representing the resonant controller operating at a starting mode or a normal operating mode when the resonant circuit enters the region of zero current switching, The logic control unit executes a corresponding protection process in response to the protection signal.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
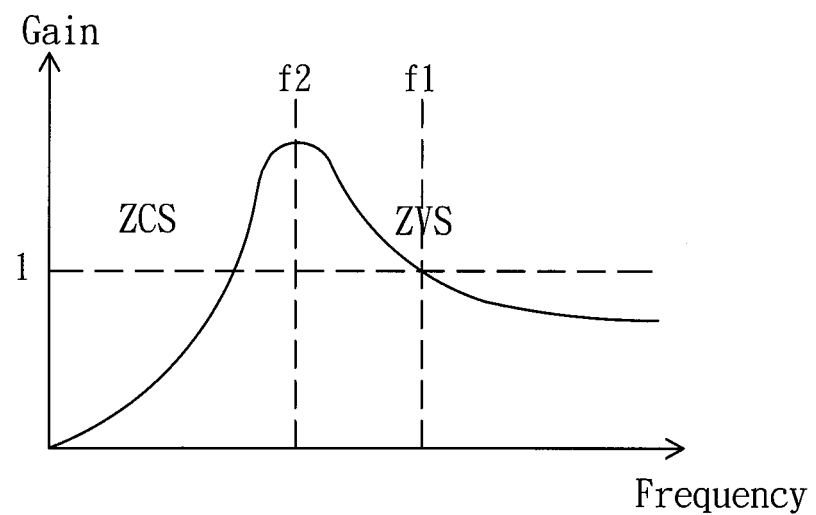
FIG. 1 is a schematic diagram of a relationship between a gain and an operating frequency of a half-bridge LLC converting circuit.
Figure 2:
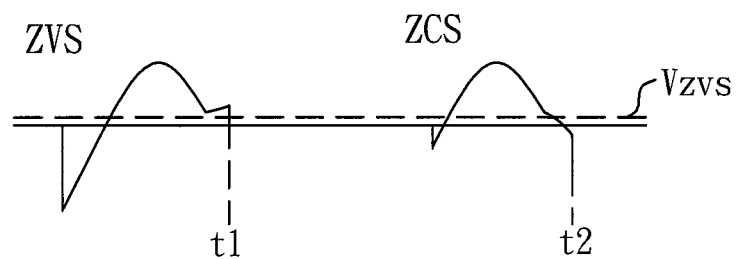
FIG. 2 shows waveform diagrams of a resonant current when a resonant circuit switching operates in regions of zero voltage switching and zero current switching.

FIG. 2 shows waveform diagrams of a resonant current when a resonant circuit switching operates in regions of zero voltage switching (ZVS) and zero current switching (ZCS). The left side of the FIG. 2 is the waveform of the resonant current when the resonant circuit operates in the region of zero voltage switching (ZVS). The resonant current is maintained above the zero axis before a switching time point t1. The right side of the FIG. 2 is the waveform of the resonant current when the resonant circuit operates in the region of zero current switching (ZCS). The resonant current is decreased to be under the zero axis before a switching time point t2. A resonance deviation determination level Vzvs is used to determine whether the resonant circuit enters a state of resonance deviation (i.e., operates in the region of zero current switching) or not in the present invention.

Figure 3:
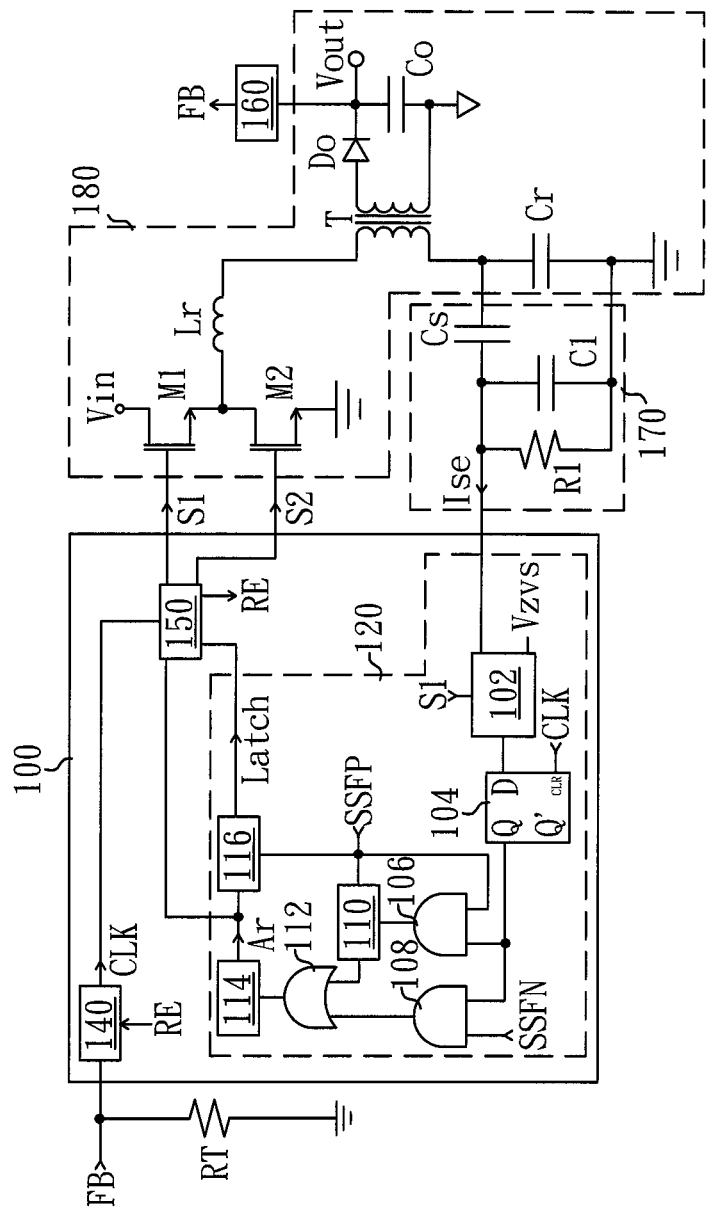
FIG. 3 is a schematic diagram of a resonant converting circuit according to a first embodiment of the present invention.

FIG. 3 is a schematic diagram of a resonant converting circuit according to a first embodiment of the present invention. The resonant converting circuit comprises a resonant controller 100, an output detecting circuit 160, a current detecting circuit 170 and a resonant circuit 180. The resonant circuit 180 has a primary side comprising transistor switches M1 and M2, a primary side of a transformer T, a resonant capacitance Cr and a resonant inductance Lr, and a secondary side comprising a secondary side of the transformer T, a rectification diode Do and an output capacitance Co. The primary side of the resonant circuit 180 is coupled to an input power source Vin to receive an electric power there from and provides an output voltage Vout in the secondary side after rectified and filtered. The current detecting circuit 170 comprises a detecting capacitance Cs, a signal resistance R1 and a signal capacitance C1. The current detecting circuit 170 is coupled to the primary side of the resonant circuit 180 to detect a resonant current flowing through the primary side of the resonant circuit 180 and generates a current detecting signal Ise. The output detecting circuit 160 is coupled to the secondary side of the resonant circuit 180 to generate a feedback signal FB according to the output voltage Vout.

The resonant controller 100 generates control signals S1 and S2 to control a power conversion of the resonant circuit according to the feedback signal FB to convert the input power source Vin into the output voltage Vout outputted in the secondary side of the resonant circuit 180. The resonant controller 100 comprises a resonance deviation protection unit 120, a frequency sweeping unit 140 and a logic control unit 150. The frequency sweeping unit 140 generates a clock signal CLK and determines maximum and minimum values of the operating frequency of the clock signal CLK when executing a frequency sweeping process according to a frequency resistance RT. The clock signal CLK may have a fixed duty cycle of 50% or less, or an adjustable duty cycle adjusted according to the feedback signal FB. The frequency sweeping unit 140 executes the frequency sweeping process to decrease the operating frequency of the clock signal CLK with time after the resonant controller 100 starts. After the frequency sweeping process finishes, the frequency sweeping unit 140 receives the feedback signal FB and accordingly adjusts the operating frequency of the clock signal CLK to stabilize the output voltage Vout.

The resonance deviation protection unit 120 detects the current detecting signal Ise in response to a phase of the clock signal CLK and determines that the resonant circuit 180 enters the state of resonance deviation (i.e., entering the region of zero current switching from the region of zero voltage switching) when the level of the current detecting signal Ise is lower than a resonance deviation determination level Vzvs. The resonance deviation protection unit 120 generates a corresponding protection signal according to an indicative signal SSFP representing an operating mode of the resonant controller 100 when the resonant circuit 180 enters the state of resonance deviation. The operating modes represented by the indicative signal SSFP have a starting mode and a normal operating mode. A timing of the starting mode is a preset period after the resonant controller starting and the frequency sweeping unit 140 starts to execute the frequency sweep process during the period. The starting mode and the frequency sweeping process may not be end simultaneously. The ends of the starting mode and the frequency sweeping process depend on the actual applications and it is not affect the function of the resonant controller 100 of the present invention. The logic control unit 150 generates the control signals S1 and S2 according to the clock signal CLK to switch the transistor switches M1 and M2 and control the power conversion of the resonant circuit 180. The logic control unit 150 executes a protection process in response to the protection signal generated by the resonance deviation protection unit 120 to avoid the resonant circuit 180 operating in the region of zero current switching.

The resonance deviation protection unit 120 comprises a falling-edge trigger 102, a D-type flip-flop 104, AND gates 106 and 108, a counter 110, an OR gate 112, a restart protection circuit 114 and a counting latch protection circuit 116. The falling-edge trigger 102 receives the current detecting signal Ise and the resonance deviation determination level Vzvs. The falling-edge trigger 102 generates a high-level signal when the level of the current detecting signal Ise is lower than the resonance deviation determination level Vzvs. For avoiding a erroneous judgment due to switching noise of transistor switch, the falling-edge trigger 102 may pause operating within a preset period after the transistor switch M1 is turned off by receiving the control signal S1. An input terminal D of the D-type flip-flop 104 is coupled to an output terminal of the falling-edge trigger 102 and the D-type flip-flop 104 receives the clock signal CLK at a trigger terminal CLR. The D-type flip-flop 104 stops detecting a signal generated by the falling-edge trigger 102 to avoid erroneous judgment when the clock signal CLK is at low level. The D-type flip-flop 104 detects the signal generated by the falling-edge trigger 102 when the clock signal CLK is at high level. The clock signal CLK may be replaced with one of the control signals S1 and S2 inputted to the D-type flip-flop 104. In general, the phases among the control signals S1, S2 and the clock signal CLK may have difference but these may not influence the determination of resonance deviation. When the clock signal CLK is at high level and the falling-edge trigger 102 outputs a high-level signal, the D-type flip-flop 104 also outputs a high-level signal at the output terminal Q. The AND gates 106, 108 are coupled to the output terminal Q of the D-type flip-flop and respectively receive the indicative signal SSFP and an inverted indicative signal SSFN, wherein the indicative signal SSFP and the inverted indicative signal SSFN are opposite signals.

The indicative signal SSFP is at high level when the resonant controller 100 operates at starting mode. At this time, the AND gate 106 output a high level signal if the D-type flip-flop outputs a high-level signal. Besides, the inverted indicative signal SSFN is at low level, the AND gate 108 is blocked and does not operate. The counter 110 receives the indicative signal SSFP and counts a number of high-level signals generated by the AND gate 106 when the indicative signal SSFP is at high level (i.e., when the resonant controller 100 operates at starting mode). At the starting mode, the operating frequency of the resonant controller 100 is controlled by the frequency sweeping unit 140, and independent of the loading. It may easily result in that the level of the current detecting signal Ise is lower than the resonance deviation determination level Vzvs. For avoiding the foregoing condition being erroneously determined a resonance deviation, the counter 110 counts the number and generates the high-level signal when the number reaches a preset value. In the present embodiment, the counter 110 may be replaced with a time counter. The time counter determines whether the number reaches a preset value or not within a preset period for better determination result. When the resonant controller 100 enters the normal operating mode from the starting mode, the indicative signal SSFP is at low level to block the function of the AND gate 106. The inverted indicative signal SSFN is at high level at this time. If the D-type flip-flop 104 outputs a high-level signal, the AND gate 108 also outputs a high-level signal. The OR gate 112 is coupled to the counter 110 and the AND gate 108. When any one of the counter 110 and the AND gate 108 outputs a high-level signal, the OR gate 112 outputs a high-level signal to the restart protection circuit 114. At this time, the restart protection circuit 114 outputs a restart protection signal Ar. The counting latch protection circuit 116 is coupled to the restart protection circuit 114 to count a number of the restart protection signal Ar generated by the restart protection circuit 114. The counting latch protection circuit 116 generates a latch protection signal LP when the number of the restart protection signal Ar reaches a preset value which is one or an integer greater than one. In the present embodiment, the counting latch protection circuit 116 also receives the indicative signal SSFP to provide different latch protection determinations in response to an operating mode of the resonant controller 100, such as the starting mode or the normal operating mode. For example, the counter latch protection circuit 116 does not execute the latch protection when the resonant controller 100 operates at starting mode; i.e., the counter latch protection circuit 116 does not generate the latch protection signal LP at the starting mode. Alternatively, the counter latch protection circuit 116 determines whether generating the latch protection signal LP or not according to different preset values in response to that the resonant controller 100 is at starting mode or normal operating mode.

The logic control unit 150 executes a restart process when receiving the restart protection signal Ar. First, the resonant controller 100 stops generating the control signals S1 and S2 and so the energy stored in the resonant circuit 180 is decreased. Then, the logic control unit 150 generates a restart signal RE to make the resonant controller 100 enter the starting mode again. When the frequency sweeping unit 140 receives the restart signal RE, the frequency sweeping unit 140 executes the frequency sweeping process and so the operating frequency of the clock signal CLK is recovered to a higher frequency and then decreased with time. The logic control unit 150 enters a latch protection state to stop outputting the control signals S1 and S2 when receiving the latch protection signal LP. Therefore, the resonant circuit 180 is stopped receiving the electric power in the primary side until the resonant controller 100 is restarted.

Figure 4:
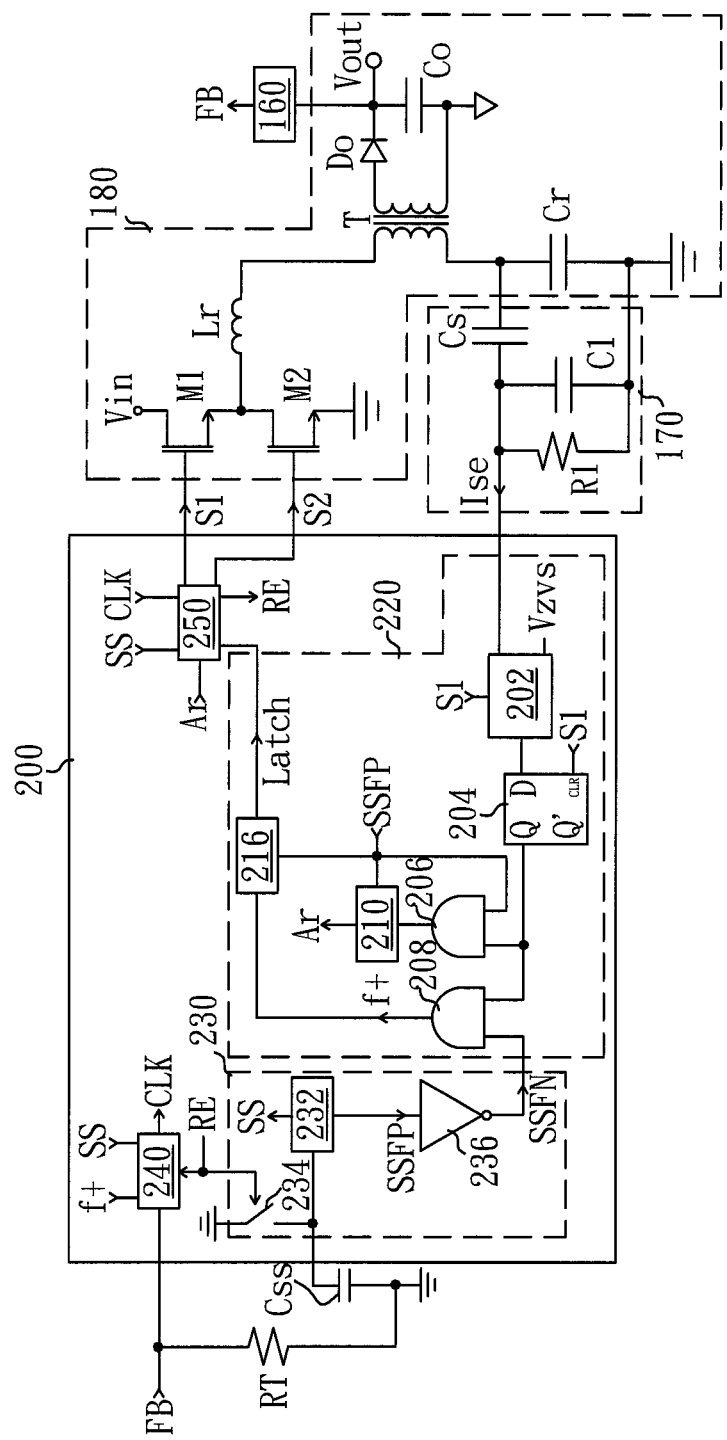
FIG. 4 is a schematic diagram of a resonant converting circuit according to a second embodiment of the present invention.

FIG. 4 is a schematic diagram of a resonant converting circuit according to a second embodiment of the present invention. The resonant converting circuit comprises a resonant controller 200, an output detecting circuit 160, a current detecting circuit 170 and a resonant circuit 180. The connection relationships and the operations of the output detecting circuit 160, the current detecting circuit 170 and the resonant circuit 180 can be referred to the description in the FIG. 3. The resonant controller 200 generates control signals S1 and S2 according to a feedback signal FB to control the power conversion of the resonant circuit 180 to convert the input power source Vin into the output voltage Vout outputted in the secondary side of the resonant circuit 180. The resonant controller 200 comprises a resonance deviation protection unit 220, a soft starting unit 230, a frequency sweeping unit 240 and a logic control unit 250. The frequency sweeping unit 240 generates a clock signal CLK and determines the maximum and minimum values of the operating frequency of the clock signal CLK according a frequency resistance RT when executing a frequency sweeping process.

The resonance deviation protection unit 220 comprises a falling-edge trigger 202, a D-type flip-flop 204, AND gates 206 and 208, a counting restart protection circuit 210 and a counting latch protection circuit 216. The falling-edge trigger 202 receives a current detecting signal Ise and a resonance deviation determination level Vzvs. The falling-edge trigger 202 generates a high-level signal when the level of the current detecting signal Ise is lower than a resonance deviation determination level Vzvs. An input terminal D of the D-type flip-flop 204 is coupled to an output terminal of the falling-edge trigger 202 and an trigger terminal CLR of the D-type flip-flop 204 receives the control signal S1. When the control signal S1 is at low level, the D-type flip-flop 204 stops detecting the signal outputted by the falling-edge trigger 202 to avoid erroneous judgment. The D-type flip-flop 204 detects the signal outputted by the falling-edge trigger 202 when the control signal S1 is at high level. The D-type flip-flop 204 outputs a high-level signal at an output terminal Q if the falling-edge trigger 202 outputs the high-level signal at this time. Both of the AND gates 206 and 208 are coupled to the output terminal Q of the D-type flip-flop 204 and respectively receive an indicative signal SSFP and an inverted indicative signal SSFN, wherein the indicative signal SSFP and the inverted indicative signal SSFN are opposite signals. The indicative signal SSFP is at high level when the resonant controller 200 operates at a starting mode. The AND gate 206 outputs a high-level signal if the D-type flip-flop 204 also outputs a high-level signal. Besides, the inverted indicative signal SSFN is at low level, the AND gate 208 is blocked and does not operate. The counting restart protection circuit 210 receives the indicative signal SSFP and counts a number of the high-level signals generated by the AND gate 206 when the indicative signal SSFP is at high level (that is the resonant controller 200 operates at the starting mode). The counting restart protection circuit 210 output s a restart protection signal Ar when the counts reaches a preset values. The indicative signal SSFP is at low level to block the function of the AND gate 206 when the resonant controller 200 enters a normal operating mode from the starting mode. The AND gate 208 outputs a frequency-increasing signal f+ if the D-type flip-flop also outputs a high-level signal when the inverted indicative signal SSFN is at high level. The counting latch protection circuit 216 is coupled to the AND gate 208 and the counting restart protection circuit 210. The counting latch protection circuit 216 counts a number of the restart protection signal Ar and the frequency-increasing signal f+ respectively and generates a latch protection signal LP when any one of the foregoing numbers reaches a preset value. In the present embodiment, the counting latch protection circuit 216 also receives the indicative signal SSFP to provide different latch protection determination in response to the operating mode of the resonant controller 200, such as: the starting mode, the normal operating mode.

The soft starting unit 230 generates a soft starting signal SS to execute a soft starting process after the resonant controller 200 starts. The level of the soft starting signal SS is increased with time during a preset period. Generally speaking, the preset period is over a period of the starting mode. The soft starting unit 230 further generates the indicative signal SSFP according to the level of the soft starting signal SS. For example, the indicative signal SSFP is at high level when the level of the soft starting signal SS is lower than 3V, and the indicative signal SSFP is at low level when the level of the soft starting signal SS reaches 3V. The soft starting unit 230 comprises a soft starting circuit 232, a restart switch 234 and an inverter 236. The soft starting unit 230 is coupled to a soft starting capacitance Css to determine the period of the soft starting process. The soft starting circuit 232 generates the soft starting signal SS and the indicative signal SSFP according to a voltage level of the soft starting capacitance Css. The inverter 236 inverts the indicative signal SSFP to generate the inverted indicative signal SSFN. The frequency sweeping unit 240 is coupled to the soft starting unit 230 to execute the frequency sweeping process according to the soft starting signal SS to decrease the operating frequency of the clock signal CLK with time. The frequency sweeping unit 240 also receives the feedback signal FB and accordingly adjusts the operating frequency of the clock signal CLK to stabilize the output voltage Vout after the frequency sweeping process finishes. The operating frequency of the clock signal CLK is increased to avoid the resonant circuit 180 operating in the region of zero current switching when the frequency sweeping unit 240 receives the frequency-increasing signal f+.

The logic control unit 250 starts a restart process when receiving the restart protection signal Ar. First, the logic control unit 250 stops outputting the control signals S1 and S2 temporarily to decrease the energy stored in the resonant circuit 180. Then, the logic control unit 250 generates a restart signal RE to make the resonant controller 200 enter starting mode again. The soft starting capacitance Css is discharged and so the voltage across the soft starting capacitance Css is decreased to a lower level or zero when the restart switch 234 in the soft starting unit 230 receives the restart signal RE. Therefore, the soft starting unit 230 can re-execute the soft starting process and the frequency sweeping unit 240 can also execute the frequency sweeping process to decrease the operating frequency of the clock signal CLK with time. The logic control unit 250 enters a latch protection state to stop outputting the control signals S1 and S2 when receiving the latch protection signal LP. The resonant circuit 180 is stopped receiving the electric power in the primary side until the resonant controller 200 is restarted.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A resonant converting circuit comprising:
    a resonant circuit, having a primary side for receiving an electric power from an input power source and a secondary side for providing an output voltage;
    a current detecting circuit, coupled to the primary side of the resonant circuit to generate a current detecting signal according to a resonant current flowing there through;
    an output detecting circuit, coupled to the secondary side of the resonant circuit and generating a feedback signal according to the output voltage; and
    a resonant controller, generating a clock signal and adjusting an operating frequency of the clock signal in response to the feedback signal for modulating the output voltage of the resonant circuit; in which the resonant controller includes a resonance deviation protection unit which detects the current detecting signal in response to a phase of the clock signal to determine whether the resonant circuit enters a region of zero current switching or not;
    wherein the resonant controller executes a corresponding protection process in response to that the resonant controller operates at a starting mode when the resonant circuit enters the region of zero current switching, wherein a timing of the starting mode is a period after the resonant controller starting and the resonant controller starts to execute a frequency sweep process during the period to decrease the operating frequency of the clock signal with time.

2. The resonant converting circuit according to claim 1, wherein when the resonant controller operates at a normal operating mode and the resonant circuit enters the region of zero current switching, one of following protection processes is executed:
    (a). increasing the operating frequency of the clock signal;
    (b). the resonant controller re-entering the starting mode;
    (c). entering a latch protection state to stop the resonant circuit receiving the electric power in the primary side thereof;
    (d). counting a number of executing the protection process (a) or protection process (b) and executing the protection process (c) when a number reaches a preset value; or
    (e). counting a number of executing the protection process (a) or the protection process (b) and executing the protection process (c) when the number reaches a preset value within a preset period.

3. The resonant converting circuit according to claim 2, wherein the resonant converting circuit re-enters the starting mode when the resonant controller operates at the starting mode and the resonant circuit enters the region of zero current switching.

4. The resonant converting circuit according to claim 1, wherein the resonant controller further comprises a frequency sweeping unit which executes a frequency sweeping process to decrease the operating frequency of the clock signal with time after the resonant controller starts.

5. A resonant controller, adapted to control a power conversion of a resonant circuit, comprising:
    a frequency sweeping unit, generating a clock signal, in which the frequency sweeping unit executes a frequency sweeping process to decrease an operating frequency of the clock signal with time after the resonant controller starts and adjusts the operating frequency of the clock signal according to a feedback signal after frequency sweeping process is finished;
    a logic control unit, controlling the power conversion of the resonant circuit according to the clock signal; and a resonance deviation protection unit, detecting the current detecting signal to determine whether the resonant circuit enters the region of zero current switching or not according to a phase of the clock signal;

wherein the resonance deviation protection unit generates a protection signal according to an indicative signal representing the resonant controller operating at a starting mode when the resonant circuit enters the region of zero current switching, and the logic control unit execute a corresponding protection process in response to the protection signal, wherein a timing of the starting mode is a period after the resonant controller starting and the resonant controller starts to execute a frequency sweep process during the period to decrease the operating frequency of the clock signal with time.

6. The resonant controller according to claim 5, wherein a duty cycle of the clock signal is 50 percent or shorter than 50 percent.

7. The resonant controller according to claim 5, further comprising a soft starting unit which generates a soft starting signal with a level increasing with time after the resonant controller starts and generates an indicative signal according to the level of the soft starting signal.

8. The resonant controller according to claim 7, wherein the frequency sweeping unit adjusts the operating frequency of the clock signal in response to the soft starting signal.

9. The resonant controller according to claim 5, wherein when the resonant controller operates at a normal operating mode and the resonant circuit enters the region of zero current switching, one of following protection processes is executed:
   (a). increasing the operating frequency of the clock signal;
   (b). the resonant controller re-entering the starting mode;
   (c). entering a latch protection state to stop the resonant circuit receiving the electric power in the primary side thereof;
   (d). counting a number of executing the protection process (a) or protection process (b) and executing the protection process (c) when a number reaches a preset value; or
   (e). counting a number of executing the protection process (a) or the protection process (b) and executing the protection process (c) when the number reaches a preset value within a preset period.

10. The resonant controller according to claim 9, wherein the resonant controller re-enters the starting mode when the resonant controller operates at the starting mode and the resonant circuit enters the region of zero current switching.

* * * * *